United States Patent
Idikurt et al.

(10) Patent No.: US 9,419,264 B2
(45) Date of Patent: Aug. 16, 2016

(54) ENERGY STORAGE MODULE INCLUDING A PLURALITY OF PRISMATIC STORAGE CELLS

(71) Applicant: Bayerische Motoren Werke Aktiengesellschaft, Munich (DE)

(72) Inventors: Tuncay Idikurt, Munich (DE); Nicolas Flahaut, Munich (DE); Gerd Woesle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/522,853

(22) Filed: Oct. 24, 2014

(65) Prior Publication Data

US 2015/0044544 A1 Feb. 12, 2015

Related U.S. Application Data

(63) Continuation of application No. PCT/EP2013/059629, filed on May 8, 2013.

(30) Foreign Application Priority Data

Jun. 28, 2012 (DE) .......................... 10 2012 211 180

(51) Int. Cl.
*H01M 2/10* (2006.01)
*H01M 10/625* (2014.01)
(Continued)

(52) U.S. Cl.
CPC ............... *H01M 2/1077* (2013.01); *B60K 1/04* (2013.01); *B60L 11/1877* (2013.01); *B60L 11/1879* (2013.01); *B60R 16/04* (2013.01); *H01M 2/1083* (2013.01); *H01M 2/1094* (2013.01);
(Continued)

(58) Field of Classification Search
None
See application file for complete search history.

(56) References Cited

U.S. PATENT DOCUMENTS 3,581,837 A * 6/1971 Bauschard .......... H01M 2/1083
180/68.5
5,620,057 A * 4/1997 Klemen .................. B60K 1/04
180/65.1
(Continued)

FOREIGN PATENT DOCUMENTS

CN 1745438 A 3/2006
CN 102237503 A 11/2011
(Continued)

OTHER PUBLICATIONS

J-PlatPat Machine Translation of the detailed description of JP 2002-141036 A (May 2002).*
(Continued)

*Primary Examiner* — Gregg Cantelmo
(74) *Attorney, Agent, or Firm* — Crowell & Moring LLP

(57) ABSTRACT

The invention relates to an energy storage module for a device for supplying voltage, particularly in a motor vehicle. The energy storage module includes several prismatic storage cells that are arranged behind one another and stacked in at least one row, two end plates, and at least one tension element. The at least one row of stacked storage cells is braced between the two end plates by the tension element, and at least one of the end plates has at least one supporting surface for support on a structure carrying the energy storage module. The energy storage module also includes at least one thermally insulating element arranged on the supporting surface for thermal insulation between the at least one of the end plates and the carrying structure.

15 Claims, 4 Drawing Sheets

(51) Int. Cl.
  *H01M 10/647* (2014.01)
  *H01M 10/658* (2014.01)
  *B60R 16/04* (2006.01)
  *B60K 1/04* (2006.01)
  *B60L 11/18* (2006.01)

(52) U.S. Cl.
  CPC .......... *H01M10/625* (2015.04); *H01M 10/647* (2015.04); *H01M 10/658* (2015.04); *H01M 2220/20* (2013.01)

(56) References Cited

U.S. PATENT DOCUMENTS

| | | | |
|---|---|---|---|
| 8,557,436 B2 | 10/2013 | Schwab | |
| 2010/0167115 A1* | 7/2010 | Okada | H01M 2/1077 |
| | | | 429/99 |
| 2011/0104548 A1 | 5/2011 | Saito et al. | |
| 2011/0206948 A1 | 8/2011 | Asai et al. | |
| 2012/0064386 A1 | 3/2012 | Oguri et al. | |
| 2014/0193686 A1 | 7/2014 | Siering et al. | |

FOREIGN PATENT DOCUMENTS

| | | | |
|---|---|---|---|
| CN | 103650200 A | | 3/2014 |
| DE | 10 2010 013 034 A1 | | 9/2011 |
| DE | 10 2010 020 065 A1 | | 11/2011 |
| DE | 10 2011 084 660 A1 | | 4/2013 |
| JP | 06107090 A | * | 4/1994 |
| JP | 7-142043 A | | 6/1995 |
| JP | 2002-141036 A | | 5/2002 |
| JP | 2002-203527 A | | 7/2002 |
| WO | WO 2012/065853 A1 | | 5/2012 |
| WO | WO 2012/065855 A1 | | 5/2012 |
| WO | WO 2013/056938 A1 | | 4/2013 |

OTHER PUBLICATIONS

International Search Report (PCT/ISA/210) dated Oct. 10, 2013 with English translation (seven pages).
German-language Written Opinion (PCT/ISA/237) dated Oct. 10, 2013 (eight pages).
German Search Report dated Mar. 8, 2013 with partial English translation (nine pages).
Chinese Office Action issued in Chinese counterpart application No. 201380021007.5 dated Feb. 29, 2016, with English translation (Seventeen (17) pages).

* cited by examiner

ENERGY STORAGE MODULE INCLUDING A PLURALITY OF PRISMATIC STORAGE CELLS

CROSS REFERENCE TO RELATED APPLICATIONS

This application is a continuation of PCT International Application No. PCT/EP2013/059629, filed May 8, 2013, which claims priority under 35 U.S.C. §119 from German Patent Application No. 10 2012 211 180.8, filed Jun. 28, 2012, the entire disclosures of which are herein expressly incorporated by reference.

BACKGROUND AND SUMMARY OF THE INVENTION

The invention relates to an energy storage module for a device for the voltage supply, particularly of a motor vehicle, including several prismatic storage cells that are arranged behind one another and stacked in at least one row, and to an energy storage arrangement having the energy storage module.

In a device for the voltage supply of a motor vehicle, usually called a battery, generally a plurality of energy storage modules is used for driving the vehicle, for example, electric vehicles or hybrid vehicles. An energy storage module typically includes several stacked prismatic storage cells. The individual storage cells contain electrochemical cells of the battery. The row of stacked storage cells is preferably braced between two end plates. The two end plates are mutually connected by way of tension rods. The bracing direction is therefore perpendicular to the end plates. In addition to being used for the mechanical fixing of the modules with respect to one another, the end plates and tension rods are particularly used for counteracting a deformation by gas pressure changes that occur during the operation in the electrochemical cells arranged in the interior of the modules. One of the energy storage modules or several of the energy storage modules are usually mounted in a carrying structure, for example, further developed as a housing.

Particularly in a motor vehicle, the energy accumulator is subjected to many different types of thermal stress. In the winter, the extreme ambient temperature of the vehicle will have to be taken into account, depending on the usage area. In the summer, the load caused by the exhaust system is added to the high ambient temperature. Here, temperatures of up to over 100° C. can be reached as a result of a high radiation load. Lithium ion cells should be operated in an ideal operating temperature range of between 20° C. and 40° C. For an optimal operating strategy, particularly a very low temperature difference is necessary between the individual cells of the energy storage module.

It is an object of the present invention to provide an energy storage module and an energy storage arrangement which, while the manufacturing and the assembly are cost-effective, can be operated as efficiently as possible.

This object is achieved by an energy storage module for a device for supplying voltage. In particular, the energy storage module in a motor vehicle is used for driving the vehicle. The energy storage module includes several prismatic storage cell which are arranged behind one another and stacked in at least one row. Furthermore, two end plates and at least one tension element are provided. The at least one row of stacked storage cells is braced between two end plates by way of the tension elements. The end plates have supporting surfaces. By way of these supporting surfaces, the energy storage module can be mounted in a carrying structure. The carrying structure is, for example, a housing in a motor vehicle for accommodating several energy storage modules. Within the scope of the invention, it was recognized that an active temperature exchange takes place between the end plates and the carrying structure. This temperature exchange considerably influences the temperature management of the energy storage module. According to exemplary embodiments of the invention, a thermally insulating element is therefore placed on the supporting surface. As much as possible, this thermally insulating element prevents the heat transfer between the respective end plate and the carrying structure.

For fastening the energy storage modules in the carrying structure, the energy storage module may include at least one bolt. This bolt is preferably constructed as a screw. The bolt projects through the supporting surface and can thereby connect the energy storage module with the carrying structure. The thermally insulating element is particularly arranged such that it is also penetrated by the bolt. For this purpose, the thermally insulating element includes a recess, such as a through hole.

Particularly preferably, a thermally insulating element is placed on all supporting surfaces of all end plates of the energy storage module.

In a development that is easy to design, the thermally insulating element is a washer. This washer is placed on the supporting surface and thereby forms a separation between the end plate and the carrying structure.

As an alternative, it is also conceivable to directly connect the thermally insulating element with a further component of the energy storage module. In a preferred embodiment, the energy storage module includes at least one thermally insulating preform between one of the end plates and the storage cell adjoining the end plate. In addition to the thermal insulation between the storage cell and the end plate, this preform is simultaneously used for electric insulation between the storage cell and the end plate. Preferably, it is now provided that the thermally insulating element, which comes to rest on the supporting surface, is arranged on this preform. In a particularly preferred embodiment, this preform is produced in one piece with at least one of the elements, for example, as an injection-molded part. In this case, the element may consist of the same material as the preform. As an alternative, it is conceivable to provide the thermally insulating element as an insert in the injection molding process for the preform. In this case, the element may consist of any highly heat-insulating material. The preform itself preferably consists of a plastic material.

It is further preferably provided that the preform has a plate-shaped construction. This plate shape has two sides. One side rests against the end plate. The other side rests against the adjoining storage cell. In particular, the preform extends over an entire storage cell front surface facing the end plate. As a result, a full-surface thermal and electric insulation is obtained between the storage cell and the end plate.

The thermally insulating element, which comes to be placed on the supporting surface, particularly preferably projects perpendicularly from the plate-shaped preform. A component of the preform, specifically the separation between the end plate and the storage cell, stands parallel to the end plate and perpendicular with respect to the bracing direction of the energy storage module. Correspondingly, the thermally insulating element stands perpendicular with respect to the end plate and parallel to the bracing direction.

The thermally insulating element preferably has a thickness of between 0.5 mm and 5 mm. Ceramics, plastics, paper or cardboard are preferably selected as the material for the thermally insulating element.

The tension elements are advantageously constructed as tension rods. As an alternative, the tensions elements may also be constructed as one or more tightening straps or as combinations, including a number of screws and nuts.

Exemplary embodiments of the invention further include an energy storage arrangement having a carrying structure and at least one energy storage module resting on the carrying structure. The carrying structure is preferably constructed as a housing for receiving several energy storage modules.

Other objects, advantages and novel features of the present invention will become apparent from the following detailed description of one or more preferred embodiments when considered in conjunction with the accompanying drawings.

DETAILED DESCRIPTION OF THE DRAWINGS

Identical or functionally identical components have the same reference symbols in all embodiments.

Figure 1:
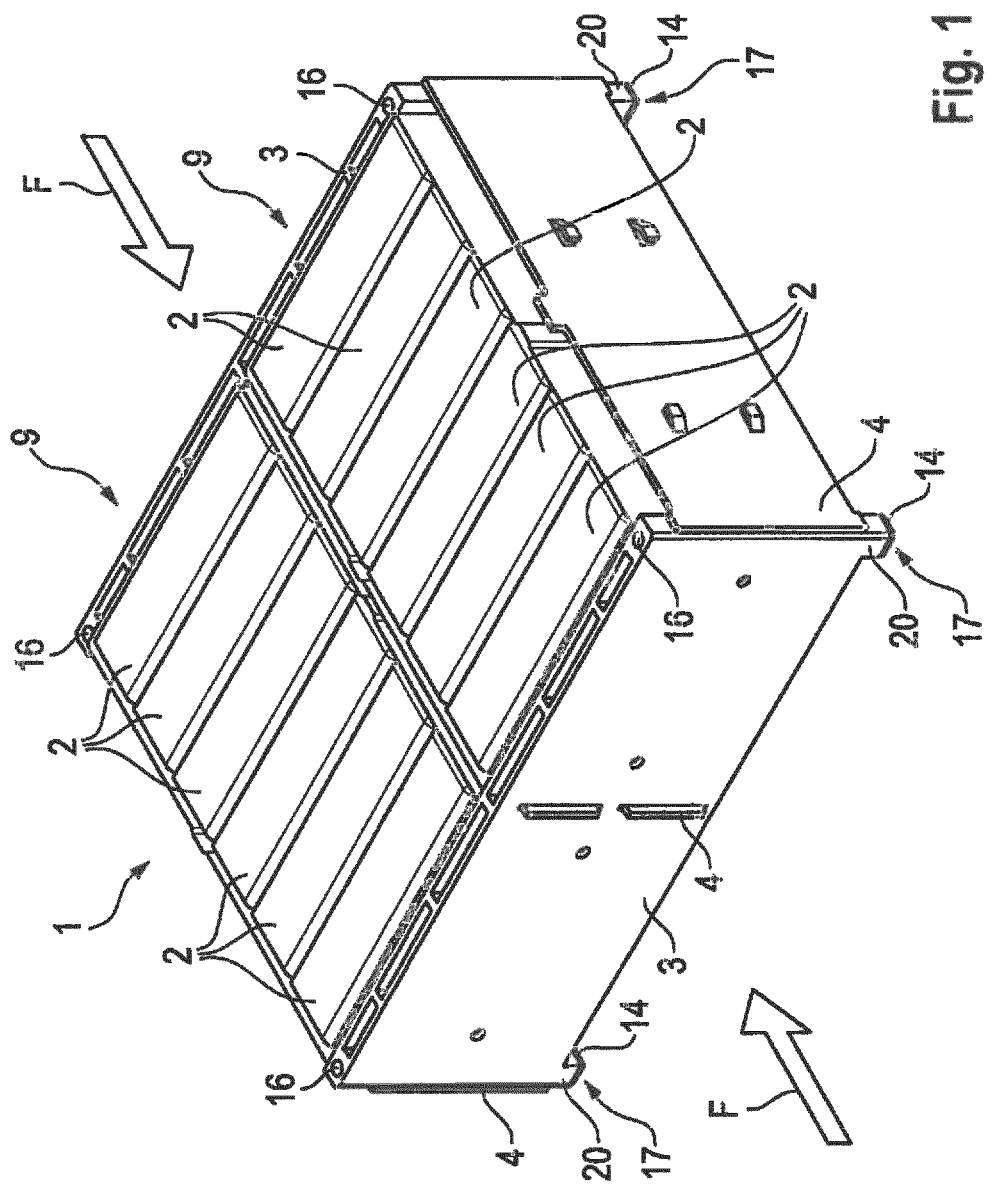
FIG. 1 is a view of an energy storage module of the invention according to a first embodiment.

FIG. 1 illustrates a storage module according to the first embodiment. The storage module 1 is composed of two rows 9. Each row has six prismatic storage cells 2. The stacked storage cells 2 are mutually connected by way of two parallel end plates 3 and tension elements, constructed as three tension rods 4. As a result of the bracing, the illustrated bracing force F acts upon the storage cells 2. In the illustrated example, the energy storage module 1 includes several rows 9. However, the invention can also be implemented on an energy storage module 1 having only one row 9. The fact that, in the present embodiment, the tension elements are constructed as tension rods 4 should have no limiting effect on the invention. Naturally, the tension elements can also be implemented as one or more tightening straps or as combinations including a number of screws and nuts.

Two feet 20 are respectively constructed at each end plate 3. The underside of the feet is called a supporting surface 17. In the motor vehicle, the energy storage module 1 stands in a carrying structure 22 (see FIG. 4). The energy storage module 1 is screwed to the carrying structure by way of fastening holes 16 in the end plates 3. In order to largely avoid a heat transfer between the end plates 3 and the carrying structure 22, a thermally insulating element 14 is placed onto the supporting surface 17 on each foot. In the first embodiment, the thermally insulating element 14 may, for example, be constructed as a washer made of ceramics or paper.

Figure 2:
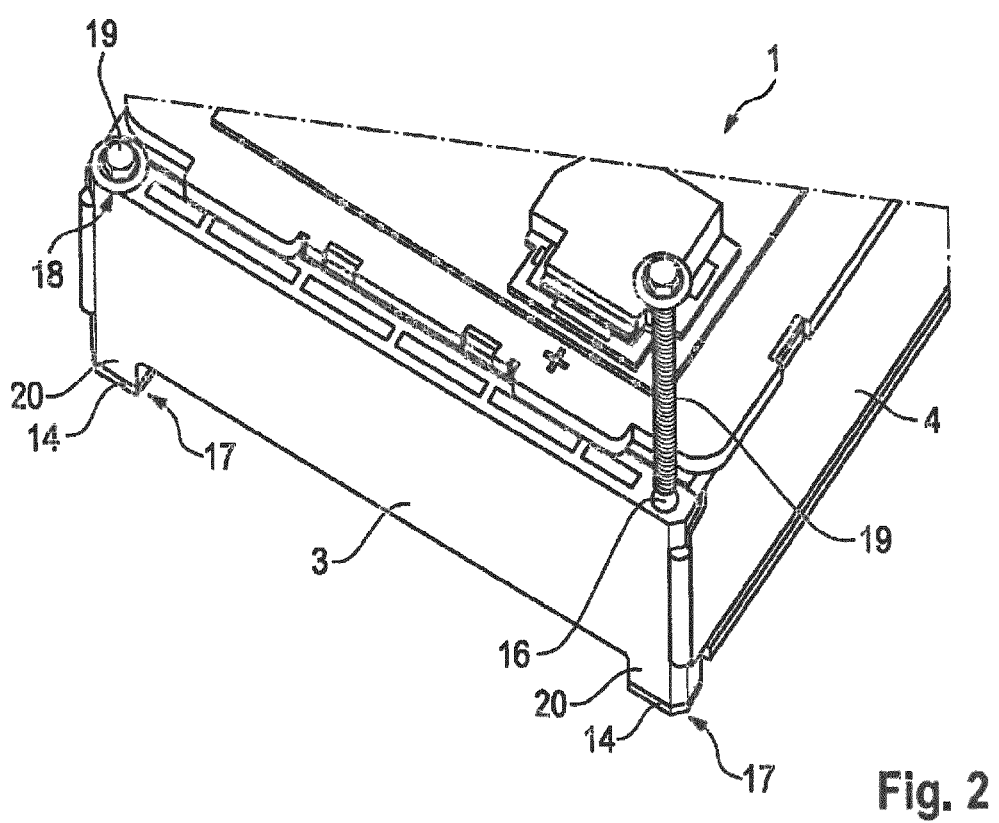
FIG. 2 is a view of a detail of the energy storage mode of the invention according to the first embodiment.

FIG. 2 illustrates a cutout of the energy storage module 1 from FIG. 1. The representation in FIG. 2 illustrates a screwed connection 18 by way of a bolt 19 constructed as a screw. A bolt 10 is inserted in each fastening hole 16 for screwing the energy storage module 1 to the carrying structure 22.

Figure 3:
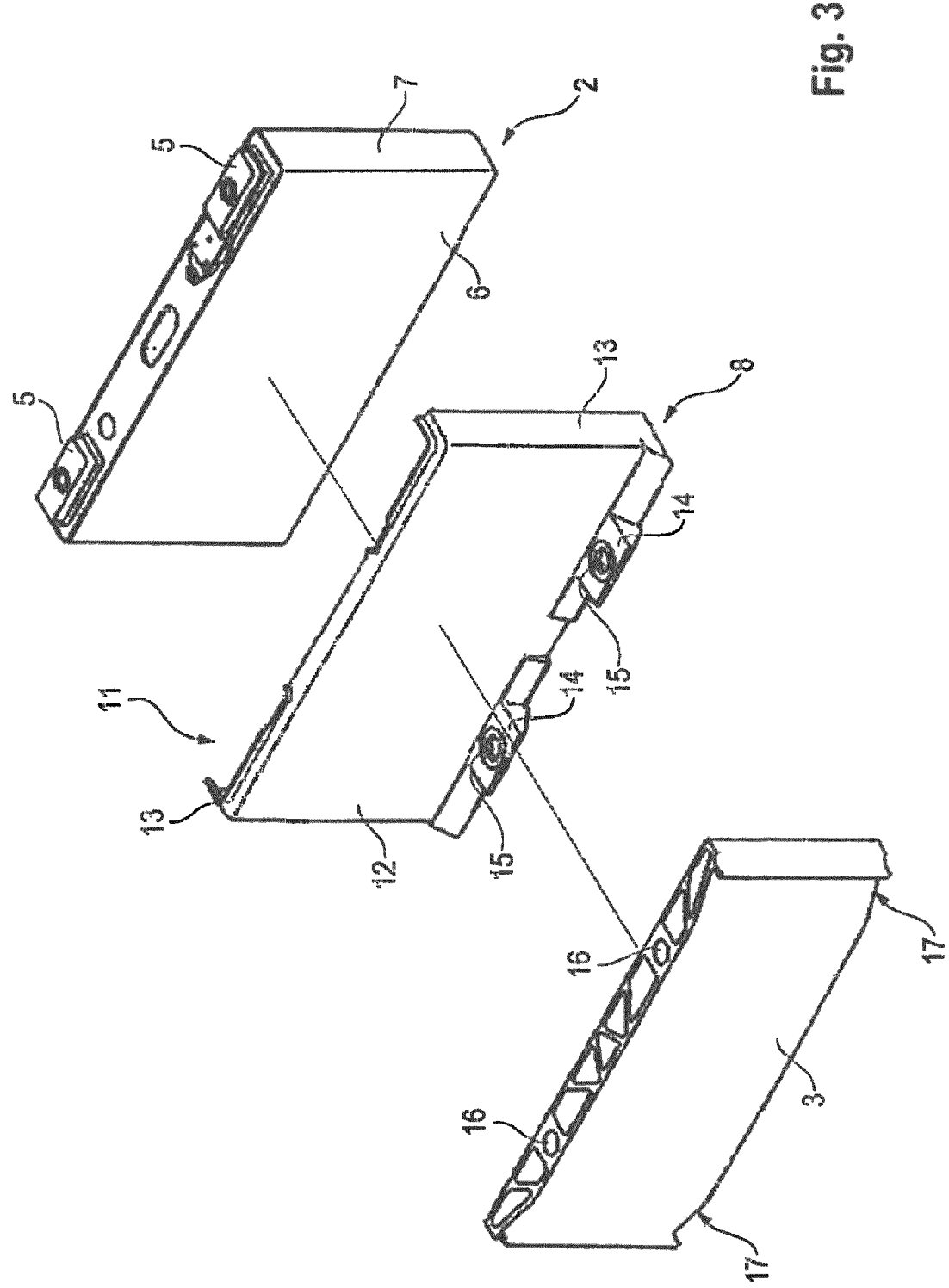
FIG. 3 is a detail in an exploded view of the energy storage module of the invention according to a second embodiment.

FIG. 3 illustrates a second embodiment of the energy storage module 1. Here, only one of the storage cells 2, the pressure plate 3 and a preform 8 made of plastic situated in-between are shown in an exploded view. The arrangement according to FIG. 3 is provided for only one row 9 of storage cells 2. Otherwise, the essential construction of the energy storage module 1 of the second embodiment corresponds to the first embodiment.

In the second embodiment, the preform 8 is inserted between the end plate 3 and the adjoining storage cell 2. The preform 8 is used for thermal insulation as well as for electric insulation. The storage cell 2 includes two connection poles 5, a storage cell front surface 6 and several storage cell side faces 7. The preform 8 has a first preform surface 11, a second preform surface 12 and several side wings 13. In the assembled condition, the second preform surface 12 rest against the end plate 3. The first preform surface 11 rests against the storage cell front surface 6. The side wings 13 at least partially cover the storage cell side faces 7. Two thermally insulating elements 14 are produced integrally with the preform 8. The thermally insulating elements 14 project perpendicularly from the plate-shaped preform 8. Through holes 15 are constructed in the thermally insulating elements 14.

The underside, which is not shown, of the end plate 3 in FIG. 2 is again called a supporting surface 17. By means of this surface, the end plate 3 rests on the carrying structure 22. In the assembled state, the two thermally insulating elements 14, which are produced integrally with the preform, rest on the supporting surface 17. The elements 14 thereby separate the end plate 3 from the carrying structure 22.

The screwed connection 18 for the fastening of the energy storage module 1 can be implemented by way of the fastening holes 16 and the through holes 14.

Figure 4:
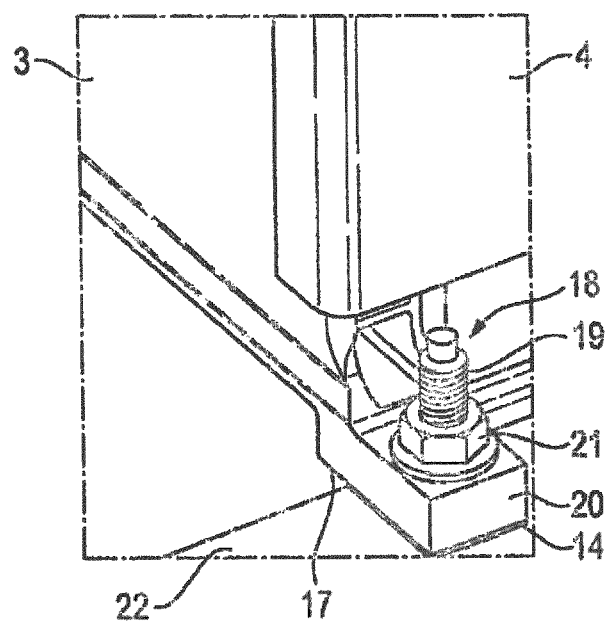
FIG. 4 is a view of a detail of the energy storage module of the invention according to a third embodiment.

FIG. 4 illustrates the energy storage module 1 according to a third embodiment. In contrast to the preceding embodiments, in the third embodiment, the screwed connection 18 is not fitted through the entire height of the end plate 3. In the fourth embodiment, the end plate 3 has feet 20 projecting to the outside. The underside of these feet 20 represents the supporting surface 17. The thermally insulating element 14 is inserted between the supporting surface 17 and the carrying structure 22.

LIST OF REFERENCE SYMBOLS

1 Energy storage module
2 Storage cells
3 End plates
4 Tension elements, constructed as tension rods
5 Connecting poles
6 Storage cell front surface
7 Storage cell side face
8 Preform
9 Row
11 First preform surface
12 Second preform surface
13 Side wing
14 Thermally insulating elements
15 Through hole
16 Fastening hole
17 Supporting surface
18 Screwed connection
19 Bolt/screw
20 Foot
21 Nut
22 Carrying structure
F Bracing force The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage module for a device for supplying voltage, the energy storage module comprising:
 a plurality of prismatic storage cells that are arranged behind one another and stacked in at least one row;
 two end plates and at least one tension element, the at least one row of storage cells being braced between the two end plates by the tension element, and at least one of the end plates having a supporting surface for support on a structure carrying the energy storage module;
 at least one thermally insulating element arranged on the supporting surface for thermal insulation between the at least one of the end plates and the carrying structure; and
 a thermally insulating preform arranged between one of the end plates and the storage cell adjoining the one of the end plates, at least one of the thermally insulating elements being arranged on the preform.

2. The energy storage module according to claim 1, further comprising at least one bolt for fastening the energy storage module on the carrying structure, the bolt penetrating the at least one thermally insulating element.

3. The energy storage module according to claim 2, wherein the bolt is constructed as a screw.

4. The energy storage module according to claim 1, wherein thermally insulating elements are arranged on all supporting surfaces of all of the end plates.

5. The energy storage module according to claim 1, wherein the at least one thermally insulating element is a washer.

6. The energy storage module according to claim 1, wherein the preform is produced in one piece with at least one of the thermally insulating elements.

7. The energy storage module according to claim 6, wherein the preform and the at least one of the thermally insulating elements are produced as an injection-molded part.

8. The energy storage module according to claim 1, wherein the preform has a plate-shaped construction, having a first side on which the one of the end plates rests, and having a second side opposite the first side, the storage cell resting on the second side.

9. The energy storage module according to claim 1, wherein the preform extends over an entire storage cell front surface facing the one of the end plates.

10. The energy storage module according to claim 1, wherein the at least one thermally insulating element has a thickness of between 0.5 mm and 5 mm.

11. The energy storage module according to claim 1, wherein the at least one thermally insulating element comprises at least one of a ceramic, a plastic material, paper, or cardboard.

12. An energy storage arrangement comprising:
 a carrying structure; and at least one energy storage module resting on the carrying structure, wherein the at least one energy storage module comprises:
 a plurality of prismatic storage cells that are arranged behind one another and stacked in at least one row;
 two end plates and at least one tension element, the at least one row of storage cells being braced between the two end plates by the tension element, and at least one of the end plates having a supporting surface for support on the carrying structure;
 at least one thermally insulating element arranged on the supporting surface for thermal insulation between the at least one of the end plates and the carrying structure; and
 a thermally insulating preform arranged between one of the end plates and the storage cell adjoining the one of the end plates, at least one of the thermally insulating elements being arranged on the preform.

13. The energy storage arrangement according to claim 12, wherein the carrying structure is constructed as a housing.

14. The energy storage arrangement according to claim 12, wherein the at least one energy storage module is fastened to the carrying structure.

15. A motor vehicle comprising: an energy storage module comprising:
 a plurality of prismatic storage cells that are arranged behind one another and stacked in at least one row;
 two end plates and at least one tension element, the at least one row of storage cells being braced between the two end plates by the tension element, and at least one of the end plates having a supporting surface for support on a structure carrying the energy storage module;
 at least one thermally insulating element arranged on the supporting surface for thermal insulation between the at least one of the end plates and the carrying structure; and
 a thermally insulating preform arranged between one of the end plates and the storage cell adjoining the one of the end plates, at least one of the thermally insulating elements being arranged on the preform.

* * * * *